United States Patent
Zhang et al.

(10) Patent No.: US 12,442,058 B2
(45) Date of Patent: Oct. 14, 2025

(54) METHOD FOR RECOVERING PRECIOUS METAL FROM PRECIOUS METAL-CONTAINING WASTE CATALYST

(71) Applicant: Heraeus Precious Metal Technology (China) Co., Ltd., Nanjing (CN)

(72) Inventors: Bin Zhang, Nanjing (CN); Chen Chen, Nanjing (CN)

(73) Assignee: HERAEUS PRECIOUS METAL TECHNOLOGY (CHINA) CO., LTD., Nanjing (CN)

( * ) Notice: Subject to any disclaimer, the term of this patent is extended or adjusted under 35 U.S.C. 154(b) by 513 days.

(21) Appl. No.: 17/996,467

(22) PCT Filed: Jan. 21, 2021

(86) PCT No.: PCT/CN2021/073038
§ 371 (c)(1),
(2) Date: Oct. 18, 2022

(87) PCT Pub. No.: WO2021/212936
PCT Pub. Date: Oct. 28, 2021

(65) Prior Publication Data
US 2023/0212712 A1    Jul. 6, 2023

(30) Foreign Application Priority Data

Apr. 23, 2020 (CN) .......................... 202010327422.5

(51) Int. Cl.
C22B 11/00 (2006.01)
C22B 7/00 (2006.01)

(52) U.S. Cl.
CPC ............ C22B 11/048 (2013.01); C22B 7/008 (2013.01); C22B 7/009 (2013.01)

(58) Field of Classification Search
CPC ....... C22B 11/048; C22B 7/008; C22B 7/009; C22B 7/006; Y02P 10/20
See application file for complete search history.

(56) References Cited

U.S. PATENT DOCUMENTS

| | | |
|---|---|---|
| 2012/0237417 A1 | 9/2012 | Kralik et al. |
| 2019/0284660 A1 | 9/2019 | Sarin et al. |

FOREIGN PATENT DOCUMENTS

| | | | |
|---|---|---|---|
| CN | 1769504 | A | 5/2006 |
| CN | 101074458 | A | 11/2007 |
| CN | 102676836 | A | 9/2012 |
| CN | 101194606 | A | 7/2013 |
| CN | 103194606 | A * | 7/2013 |
| CN | 108707751 | A | 10/2018 |
| CN | 111411240 | A | 7/2020 |

OTHER PUBLICATIONS

CN-103194606-A: Espacenet English machine translation (Year: 2013).*
Dong, Haigang, et al., "Recovery of Platinum Group Metals from Spent Catalysts: A Review", International Journal of Mineral Processing, 2015, 145:108-113.
Zaho, Yuanyaun, et al., "Hydrogenation of Aqueous Acetic Acid Over Ru—Sn/TiO2 Catalyst in a Flow-Type Reactor, Governed by Reverse Reaction", Catalysts, 2020, 10:1270, 13 pages.

* cited by examiner

Primary Examiner — Adil A. Siddiqui
(74) Attorney, Agent, or Firm — Blank Rome LLP

(57) ABSTRACT

A method for recovering a precious metal from a precious metal-containing waste catalyst includes the following steps: i) at least partially dissolving a precious metal-containing waste catalyst in an alkaline aqueous solution; ii) performing filtering to obtain a precious metal-containing filtrate and a precious metal; iii) treating the filtrate with a reducing agent; and iv) separating the precious metal from the filtrate after treatment, wherein step iii) is performed under a pressure of 8-12 bar at a temperature of 190-210° C. for 2-4 h. The method provided in the present invention has a simple process and a high recovery rate. The filtrate obtained from separation comprises a precious metal of 1 ppm or less by weight.

20 Claims, No Drawings

METHOD FOR RECOVERING PRECIOUS METAL FROM PRECIOUS METAL-CONTAINING WASTE CATALYST

CROSS REFERENCE TO RELATED APPLICATIONS

This application is national stage of PCT/CN2021/073038 filed Jan. 21, 2021, which claims the benefit of Chinese Application No. 202010327422.5 filed Apr. 23, 2020.

TECHNICAL FIELD

The present invention relates to a method for recovering a precious metal, particularly to a method for recovering a precious metal from a precious metal-containing waste catalyst.

BACKGROUND

Precious metals are very rare on earth. But precious metals and compounds thereof usually have unique physical and chemical properties, such that they are widely applied in the fields of petrochemical engineering, aerospace, electronics, atomic energy, experimental apparatuses, medicines and the like. Particularly, owing to excellent catalytic activities, precious metal-containing catalysts are widely used in the field of petrochemical engineering.

Precious metal-containing catalysts mainly consist of carriers and precious metal active substances. The existing carrier materials mainly comprise silicon dioxide carriers, aluminum oxide carriers, molecular sieve carriers and the like, and the active substances mainly comprise Pt, Pd, Rh and the like. The precious metal-containing catalysts usually lose activities gradually after use and become precious metal-containing waste catalysts. Compared with preparation of new precious metal-containing catalysts, recycling of precious metal-containing waste catalysts has the advantages of a high precious metal content, a relatively simple process, low processing costs and the like, and therefore, countries around the world place great emphasis on recycling of precious metal-containing waste catalysts.

CN 101074458 A discloses a method for recovering a precious metal from a precious metal-containing waste catalyst. The method mainly includes the following steps: pre-treating a precious metal-containing waste catalyst by means of segmented calcination, leaching the precious metal with a solution, and then purifying and recovering the precious metal from the solution, wherein the purifying and recovering the precious metal from the solution can be performed by means of various common methods in the prior art such as a solvent extraction method, a step-wise precipitation method and a resin exchange method. Preferably a step-wise precipitation method is used, and the method includes: adjusting the pH of the precious metal-containing solution to 4-5 with an alkali, and removing a precipitate; and then adding an alkali to adjust the pH of the solution to 8-9, and reducing the solution with a hydrazine hydrate to obtain the precious metal after removal of a precipitate, wherein the alkali used is selected from various common alkaline substances in the art, preferably hydroxides of alkali metals, such as sodium hydroxide and potassium hydroxide. Use of this method attains an overall Pt recovery of up to 96.6 wt %.

CN 102676836 A discloses a method for recovering a precious metal from a precious metal-containing composition, including the following steps: i) providing a precious metal-containing composition containing an adsorption agent that is based on an inorganic material, and is functionalized by organic groups such that at least one precious metal is adsorbed thereto; ii) calcining the precious metal-containing composition provided in step i) to adjust a residual carbon content to at most 10 wt % relative to the total weight of the precious metal-containing composition after calcination, so as to obtain a calcined composition; iii) at least partially dissolving the calcined composition obtained in step ii) in an alkaline aqueous solution to obtain a precious metal-containing residue; iv) at least partially dissolving the precious metal-containing residue obtained in step iii) in an oxidizing aqueous acid to obtain an aqueous salt solution of the precious metal; and v) if appropriate, recovering the precious metal by reducing the precious metal salt obtained in step iv). By adopting the method, it is generally possible to obtain a residue solution with a low precious metal concentration of less than 5 mg/l or even less than 1 mg/l.

CN 108707751 A discloses a method for reducing a low-concentration platinum group metal in a highly alkaline desilication solution, including the following steps: 1) filling a desilication solution in a reactor, and then heating the reactor to 50-80° C.; 2) adding a liquid reducing agent, the volume ratio of the liquid reducing agent to the desilication solution being 0.001-0.01:1; 3) holding same at 50-80° C. for 0.5-2 h; 4) heating the desilication solution to 60-90° C.; 5) adding a solid reducing agent, wherein an amount of the solid reducing agent to be added is 10-50 g per liter of the desilication solution; 6) holding same at 60-90° C. for 0.5-5 h; 7) adding a flocculant, the volume ratio of the flocculant to the desilication solution being 0.0001-0.003:1; and 8) performing filtering after sedimentation of the desilication solution in 3-10 h.

Generally, the recycling costs of precious metal-containing waste catalysts depend on the process complexity and precious metal recovery rates. A simple process and a high recovery rate are desired. Therefore, there is still a need for a method for recovering a precious metal from a precious metal-containing waste catalyst with a simple process and a high recovery rate.

SUMMARY

The objective of the present invention is to provide a method for recovering a precious metal from a precious metal-containing waste catalyst with a simple process and a high recovery rate, the method comprising the following steps:
i) at least partially dissolving a precious metal-containing waste catalyst in an alkaline aqueous solution;
ii) performing filtering to obtain a precious metal-containing filtrate and a precious metal;
iii) treating the filtrate with a reducing agent; and
iv) separating the precious metal from the filtrate after treatment,
wherein step iii) is performed under a pressure of 8-12 bar at a temperature of 190-210° C. for 2-4 h.

The beneficial effects of the present invention are as follows: The method for recovering a precious metal from a precious metal-containing waste catalyst according to the present invention is easy to implement. In addition, the method for recovering a precious metal from a precious metal-containing waste catalyst according to the present invention has a high recovery rate. In step iv), the filtrate obtained from separation comprises a precious metal of 1 ppm or less by weight.

DETAILED DESCRIPTION

Specific embodiments, variations and examples are set forth below, including exemplary embodiments provided to facilitate understanding of the claimed invention. Although the detailed description below provides specific preferred embodiments, those skilled in the art shall understand that these embodiments are merely exemplary and the present invention can be practiced in other ways.

Provided in an embodiment is a method for recovering a precious metal from a precious metal-containing waste catalyst, including the following steps:
  i) at least partially dissolving a precious metal-containing waste catalyst in an alkaline aqueous solution;
  ii) performing filtering to obtain a precious metal-containing filtrate and a precious metal;
  iii) treating the filtrate with a reducing agent; and
  iv) separating the precious metal from the filtrate after treatment,
  wherein step iii) is performed under a pressure of 8-12 bar at a temperature of 190-210° C. for 2-4 h.

Provided in another embodiment is a method for recovering a precious metal from a precious metal-containing waste catalyst, the method consisting of the following steps:
  i) at least partially dissolving a precious metal-containing waste catalyst in an alkaline aqueous solution;
  ii) performing filtering to obtain a precious metal-containing filtrate and a precious metal;
  iii) treating the filtrate with a reducing agent; and
  iv) separating the precious metal from the filtrate after treatment,
  wherein step iii) is performed under a pressure of 8-12 bar at a temperature of 190-210° C. for 2-4 h.

Preferably, the possible precious metal in the precious metal-containing waste catalyst is, for example, platinum, palladium, rhodium, iridium, osmium, ruthenium, gold, silver and the like, preferably platinum, palladium, rhodium and iridium, more preferably platinum and palladium, and most preferably platinum.

The precious metal-containing waste catalyst is, for example, a supported catalyst, wherein a carrier is silicon dioxide ($SiO_2$), and the precious metal is one or more of platinum, palladium, rhodium, iridium, osmium, ruthenium, gold and silver. Preferably, the carrier is $SiO_2$, and the precious metal is one or more of platinum, palladium, rhodium and iridium. More preferably, the carrier is $SiO_2$, and the precious metal is platinum.

The precious metal-containing waste catalyst is, for example, a waste catalyst from hydroprocessing, hydrocracking, hydrorefining and the like, and particularly, for example, a waste catalyst Pt—$SiO_2$ obtained from hydrogenation of acetic acid for production of ethanol.

In step i) of the method of the present invention, the alkaline aqueous solution is a NaOH aqueous solution, a KOH aqueous solution or a combination thereof. Preferably, the alkaline aqueous solution is a NaOH aqueous solution.

In an embodiment, the concentration of the alkaline aqueous solution in step i) of the method of the present invention is at least 10 wt %, preferably at least 15 wt %, and more preferably at least 20 wt %, based on the total weight of the alkaline aqueous solution used in step i). In a preferred embodiment, the concentration of the alkaline aqueous solution is 20-55 wt %, based on the total weight of the alkaline aqueous solution used in step i). Without being bound by theory, the weight ratio of the alkaline aqueous solution to the waste catalyst is preferably 3:1 to 5:1.

In a preferred embodiment, in step ii), filtering is performed by means of filter paper to obtain a precious metal-containing filtrate and a precious metal.

In an embodiment, step iii) is performed under a pressure of 9-12 bar at a temperature of 190-200° C. for 2-3 h.

In an embodiment, step iii) is performed under a pressure of 10-12 bar at a temperature of 190-200° C. for 2-3 h.

Preferably, the reducing agent used in step iii) includes at least one organic reducing agent or hydrogen.

The at least one organic reducing agent is selected from the group consisting of formic acid, formate, formaldehyde, a low-grade alkanol such as a C1-C4 alcohol, ascorbic acid, glucose, gluconic acid, and oxalic acid. Preferably, the formate is sodium formate.

In an embodiment, an amount of the reducing agent used in step iii) is 0.1-2.0 wt %, preferably 0.5-1.0 wt %, relative to the weight of the filtrate.

In step iv) of the method of the present invention, after the solution obtained from step iii) is cooled, the precious metal is separated therefrom. Preferably, the solution obtained from step iii) is cooled to 100° C. or less, preferably 40-80° C., and then the precious metal is separated therefrom.

In an embodiment, in step iv), the precious metal is separated from the solution obtained from step iii) by means of filtering.

In an embodiment, in step iv), the filtrate obtained from separation comprises a precious metal of 1 ppm or less by weight.

Those skilled in the art could easily understand the present invention according to the embodiments below:

Embodiment 1. A method for recovering a precious metal from a precious metal-containing waste catalyst, including the following steps:
  i) at least partially dissolving a precious metal-containing waste catalyst in an alkaline aqueous solution;
  ii) performing filtering to obtain a precious metal-containing filtrate and a precious metal;
  iii) treating the filtrate with a reducing agent; and
  iv) separating the precious metal from the filtrate after treatment,
  wherein step iii) is performed under a pressure of 8-12 bar at a temperature of 190-210° C. for 2-4 h.

Embodiment 2. The method according to embodiment 1, wherein the method consists of steps i), ii), iii) and iv).

Embodiment 3. The method according to embodiment 1 or 2, wherein the reducing agent includes at least one organic reducing agent or hydrogen.

Embodiment 4. The method according to embodiment 3, wherein the at least one organic reducing agent is selected from the group consisting of formic acid, formate, formaldehyde, a low-grade alkanol, ascorbic acid, glucose, gluconic acid, and oxalic acid.

Embodiment 5. The method according to embodiment 4, wherein the formate is sodium formate.

Embodiment 6. The method according to any one of the preceding embodiments, wherein the precious metal-containing waste catalyst is a supported catalyst, a carrier is $SiO_2$, and the precious metal is one or more of platinum, palladium, rhodium, iridium, osmium, ruthenium, gold and silver.

Embodiment 7. The method according to embodiment 6, wherein the carrier is $SiO_2$, and the precious metal is one or more of platinum, palladium, rhodium and iridium.

Embodiment 8. The method according to embodiment 7, wherein the carrier is $SiO_2$, and the precious metal is platinum.

Embodiment 9. The method according to any one of the preceding embodiments, wherein the alkaline aqueous solution is a NaOH aqueous solution, a KOH aqueous solution or a combination thereof.

Embodiment 10. The method according to embodiment 9, wherein the concentration of the alkaline aqueous solution is at least 10 wt %, preferably at least 15 wt %, and more preferably at least 20 wt %, based on the total weight of the alkaline aqueous solution used in step i).

Embodiment 11. The method according to embodiment 10, wherein the concentration of the alkaline aqueous solution is 20-55 wt %.

Embodiment 12. The method according to any one of the preceding embodiments, wherein the weight ratio of the alkaline aqueous solution to the waste catalyst is 3:1 to 5:1.

Embodiment 13. The method according to any one of the preceding embodiments, wherein step iii) is performed under a pressure of 9-12 bar at a temperature of 190-200° C. for 2-3 h.

Embodiment 14. The method according to any one of the preceding embodiments, wherein step iii) is performed under a pressure of 10-12 bar at a temperature of 190-200° C. for 2-3 h.

Embodiment 15. The method according to any one of the preceding embodiments, wherein in step iii), an amount of the reducing agent is 0.1-2.0 wt %, preferably 0.5-1.0 wt %, relative to the weight of the filtrate.

Embodiment 16. The method according to any one of the preceding embodiments, wherein in step iv), after the solution obtained from step iii) is cooled, the precious metal is separated therefrom.

Embodiment 17. The method according to embodiment 16, wherein the solution obtained from step iii) is cooled to 100° C. or less, preferably 40-80° C.

Embodiment 18. The method according to any one of the preceding embodiments, wherein in step iv), the precious metal is separated from the solution obtained from step iii) by means of filtering.

Embodiment 19. The method according to any one of the preceding embodiments, wherein in step iv), the filtrate obtained from separation comprises a precious metal of 1 ppm or less by weight.

EXAMPLES

Comparative Example 1

At a temperature of 70° C., a silicon dioxide supported platinum-containing waste catalyst (a waste catalyst obtained from hydrogenation of acetic acid for production of ethanol) was treated with 45 wt % a sodium hydroxide solution, wherein the volume ratio of the sodium hydroxide solution to the waste catalyst was 3:1. Then filtering was performed to obtain a sodium silicate filtrate having a platinum content of 28 ppm by weight.

420 ml of the sodium silicate filtrate was added to a vacuum reactor, and then a sodium formate aqueous solution was added, wherein the concentration of the sodium formate aqueous solution was 500 g/L, and the volume ratio of the sodium silicate filtrate to the sodium formate aqueous solution was 250:2.

Nitrogen was introduced to the reactor, such that a pressure in the reactor was 1.0 bar, and then the reactor was closed.

The reactor was heated, such that the temperature in the reactor was increased from room temperature (25° C.) to 150° C. within 40 min and held for 2 h, and the pressure was recorded as 5 bar.

After the temperature in the reactor dropped to 60° C., filtering was performed, and the platinum content of the filtrate was measured to be 6 ppm by weight.

Comparative Example 2

At a temperature of 70° C., a silicon dioxide supported platinum-containing waste catalyst (a waste catalyst obtained from hydrogenation of acetic acid for production of ethanol) was treated with 45 wt % a sodium hydroxide solution, wherein the volume ratio of the sodium hydroxide solution to the waste catalyst was 3:1. Then filtering was performed to obtain a sodium silicate filtrate having a platinum content of 28 ppm by weight.

420 ml of the sodium silicate filtrate was added to a vacuum reactor, and then a sodium formate aqueous solution was added, wherein the concentration of the sodium formate aqueous solution was 500 g/L, and the volume ratio of the sodium silicate filtrate to the sodium formate aqueous solution was 250:2.

Nitrogen was introduced to the reactor, such that a pressure in the reactor was 1.0 Pa, and then the reactor was closed.

The reactor was heated, such that the temperature in the reactor was increased from room temperature (25° C.) to 170° C. within 40 min and held for 2 h, and the pressure was recorded as 7 Pa.

After the temperature in the reactor dropped to 60° C., filtering was performed, and the platinum content of the filtrate was measured to be 2.5 ppm by weight.

Example 1

At a temperature of 70° C., a silicon dioxide supported platinum-containing waste catalyst (a waste catalyst obtained from hydrogenation of acetic acid for production of ethanol) was treated with 45 wt % a sodium hydroxide solution, wherein the volume ratio of the sodium hydroxide solution to the waste catalyst was 3:1. Then filtering was performed to obtain a sodium silicate filtrate having a platinum content of 28 ppm by weight.

420 ml of the sodium silicate filtrate was added to a vacuum reactor, and then a sodium formate aqueous solution was added, wherein the concentration of the sodium formate aqueous solution was 500 g/L, and the volume ratio of the sodium silicate filtrate to the sodium formate aqueous solution was 250:2.

Nitrogen was introduced into the reactor, such that a pressure in the reactor was 1.0 bar, and then the reactor was closed.

The reactor was heated, such that the temperature in the reactor was increased from room temperature (25° C.) to 190° C. within 40 min and held for 2 h, and the pressure was recorded as 12 bar.

After the temperature in the reactor dropped to 60° C., filtering was performed, and the platinum content of the filtrate was measured to be 1 ppm by weight.

In accordance with the above-mentioned example, it can be seen that the method provided by the present invention has simple operating steps compared with the prior art. In addition, by comparing the example of the present invention with the comparative examples, it is found that the method has a high platinum recovery rate due to the reaction temperature and the pressure, that is, the platinum content in the filtrate is 1 ppm by weight.

When numerical lower limits and numerical upper limits are listed herein, ranges from any lower limit to any upper limit are taken into consideration. Although exemplary embodiments of the present invention have been specifically described, it is to be understood that those skilled in the art could easily conceive of and make various other modifications without departing from the spirit and scope of the present invention.

The invention claimed is:

1. A method for recovering a precious metal from a precious metal-containing waste catalyst, the method comprising the following steps:
   i) at least partially dissolving a precious metal-containing waste catalyst in an alkaline aqueous solution, where the precious metal-containing waste catalyst is a supported catalyst comprising an $SiO_2$ carrier and a precious metal, where the precious metal is one or more of platinum, palladium, rhodium, iridium, osmium, ruthenium, gold, and silver;
   ii) performing filtering to obtain a precious metal-containing filtrate and the precious metal;
   iii) treating the filtrate with a reducing agent; and
   iv) separating the precious metal from the filtrate after treatment,
   wherein step iii) is performed under a pressure of 8-12 bar at a temperature of 190-210° C. for 2-4 h.

2. The method according to claim 1, wherein the method consists of steps i), ii), iii) and iv).

3. The method according to claim 1, wherein the reducing agent comprises at least one organic reducing agent or hydrogen.

4. The method according to claim 3, wherein the at least one organic reducing agent is selected from the group consisting of formic acid, a formate, formaldehyde, a low-grade alkanol, ascorbic acid, glucose, gluconic acid, and oxalic acid.

5. The method according to claim 3, wherein the at least one organic reducing agent is sodium formate.

6. The method according to claim 1, wherein the precious metal is one or more of platinum, palladium, rhodium and iridium.

7. The method according to claim 1, wherein the precious metal is platinum.

8. The method according to claim 1, wherein the alkaline aqueous solution is a NaOH aqueous solution, a KOH aqueous solution or a combination thereof.

9. The method according to claim 8, wherein the concentration of the alkaline aqueous solution is at least 10 wt.

10. The method according to claim 9, wherein the concentration of the alkaline aqueous solution is 20-55 wt %.

11. The method according to claim 1, wherein the weight ratio of the alkaline aqueous solution to the precious metal-containing waste catalyst is 3:1 to 5:1.

12. The method according to claim 1, wherein step iii) is performed under a pressure of 9-12 bar at a temperature of 190-200° C. for 2-3 h.

13. The method according to claim 1, wherein step iii) is performed under a pressure of 10-12 bar at a temperature of 190-200° C. for 2-3 h.

14. The method according to claim 1, wherein in step iii), an amount of the reducing agent is 0.1-2.0 wt %, relative to the weight of the filtrate.

15. The method according to claim 1, wherein in step iv), after the filtrate obtained from step iii) is cooled, the precious metal is separated therefrom.

16. The method according to claim 15, wherein the filtrate obtained from step iii) is cooled to 100° C. or less.

17. The method according to claim 15, wherein the filtrate obtained from step iii) is cooled to 40-80° C.

18. The method according to claim 1, wherein in step iv), the precious metal is separated from the filtrate obtained from step iii) by means of filtering.

19. The method according to claim 1, wherein in step iv), the filtrate remaining after precious metal separation comprises the precious metal in an amount of 1 ppm or less by weight.

20. The method according to claim 1, wherein the precious metal-containing waste catalyst is obtained from an acetic acid hydrogenation reaction.

* * * * *